United States Patent
Jin

(10) Patent No.: US 12,049,224 B2
(45) Date of Patent: Jul. 30, 2024

(54) APPARATUS AND METHOD FOR CONTROLLING CHANGE IN SPEED OF VEHICLE

(71) Applicants: HYUNDAI MOTOR COMPANY, Seoul (KR); KIA CORPORATION, Seoul (KR)

(72) Inventor: Jung Hoon Jin, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 211 days.

(21) Appl. No.: 17/669,115

(22) Filed: Feb. 10, 2022

(65) Prior Publication Data

US 2023/0127072 A1    Apr. 27, 2023

(30) Foreign Application Priority Data

Oct. 25, 2021    (KR) .................. 10-2021-0142684

(51) Int. Cl.
*B60W 30/18* (2012.01)
*B60L 15/20* (2006.01)
(Continued)

(52) U.S. Cl.
CPC ... *B60W 30/18127* (2013.01); *B60L 15/2009* (2013.01); *B60W 10/08* (2013.01);
(Continued)

(58) Field of Classification Search
CPC ............. B60L 15/2009; B60L 2240/14; B60L 2240/26; B60L 2240/423; B60L 2240/48;
(Continued)

(56) References Cited

U.S. PATENT DOCUMENTS

| | | | | |
|---|---|---|---|---|
| 6,126,251 A | * | 10/2000 | Yoshii | B60W 10/184 |
| | | | | 303/152 |
| 2021/0162978 A1 | * | 6/2021 | Kitai | B60W 10/08 |
| 2023/0034858 A1 | * | 2/2023 | Gloceri | B60W 40/1005 |

FOREIGN PATENT DOCUMENTS

| JP | 2015123757 A | * | 7/2015 |
|---|---|---|---|
| KR | 10-1856415 B1 | | 5/2018 |

OTHER PUBLICATIONS

Cartech, "Transaxles," captured Feb. 14, 2020, accessed Oct. 27, 23. http://thecartech.com/subjects/auto_eng/Transaxles.htm. (Year: 2020).*

\* cited by examiner

*Primary Examiner* — Hung Q Nguyen
*Assistant Examiner* — Mark L. Greene
(74) *Attorney, Agent, or Firm* — MORGAN, LEWIS & BOCKIUS LLP

(57) ABSTRACT

An apparatus for controlling a change in speed of a vehicle, includes: an auxiliary braking signal unit receiving an auxiliary braking related signal from a driver; a vehicle control unit receiving the auxiliary braking related signal from the auxiliary braking signal unit while controlling the vehicle; a motor control unit receiving a command for auxiliary braking from the vehicle control unit and decelerating the vehicle by regenerative braking of a driving motor; a transmission control unit controlling a transmission during deceleration of the vehicle and transmitting information of whether a change in speed is performed to the vehicle control unit; and a braking control unit connected to a brake through a fluid pressure line, and controlling the brake so that the brake applies braking pressure to a wheel by an amount of reduction in regenerative braking torque when the transmission is downshifted.

9 Claims, 6 Drawing Sheets

(51) Int. Cl.
*B60W 10/08* (2006.01)
*B60W 10/11* (2012.01)
*B60W 10/184* (2012.01)
*B60W 20/30* (2016.01)
*B60W 40/13* (2012.01)

(52) U.S. Cl.
CPC .......... *B60W 10/11* (2013.01); *B60W 10/184* (2013.01); *B60W 20/30* (2013.01); *B60L 2240/14* (2013.01); *B60L 2240/26* (2013.01); *B60L 2240/423* (2013.01); *B60L 2240/48* (2013.01); *B60T 2270/60* (2013.01); *B60W 40/13* (2013.01); *B60W 2510/083* (2013.01); *B60W 2510/1005* (2013.01); *B60W 2520/105* (2013.01); *B60W 2530/10* (2013.01); *B60W 2710/083* (2013.01); *B60W 2710/182* (2013.01); *B60Y 2200/91* (2013.01); *B60Y 2400/306* (2013.01)

(58) Field of Classification Search
CPC ... B60T 2270/60; B60W 10/08; B60W 10/11; B60W 10/184; B60W 20/30; B60W 30/18127; B60W 40/13; B60W 2510/083; B60W 2510/1005; B60W 2520/105; B60W 2530/10; B60W 2710/083; B60W 2710/182; B60Y 2200/91; B60Y 2400/306; G05D 1/0061; G05D 1/0088; G05D 1/021; G05D 1/0214; G05D 1/0221; G05D 1/0223
See application file for complete search history.

APPARATUS AND METHOD FOR CONTROLLING CHANGE IN SPEED OF VEHICLE

CROSS-REFERENCE TO RELATED APPLICATION(S)

This application claims the benefit of priority to Korean Patent Application No. 10-2021-0142684 filed on Oct. 25, 2021 in the Korean Intellectual Property Office, the disclosure of which is incorporated herein by reference in its entirety.

TECHNICAL FIELD

The present disclosure relates to an apparatus for controlling a change in speed of a vehicle and a method for controlling a change in speed of a vehicle capable of resolving shift shock, braking slip, and the like, during a change in speed by regenerative braking in a vehicle such as a large electric vehicle equipped with a transmission.

BACKGROUND

For example, a large electric vehicle such as a bus, a truck, or the like, equipped with a fuel cell system, is driven by operating a driving motor with electricity produced by a fuel cell stack. In other word, large electric vehicles are driven only by a driving force of the driving motor without an engine.

Commercial vehicles are regulated by law to generate braking force with an auxiliary braking device using an auxiliary braking switch instead of a main braking device using a brake pedal. Accordingly, a large electric vehicle may have an energy regeneration function using regenerative braking as auxiliary braking.

Meanwhile, a conventional electric vehicle does not require a transmission because a driving motor itself may exhibit sufficiently high efficiency, but a large electric vehicle has a heavy weight thereof and requires an installation of the transmission to drive on a rough road such as a mountain road, or the like.

In this case, when the vehicle is stopped or decelerated by regenerative braking using an auxiliary braking switch, a shock occurs during a change in speed by regenerative braking, and an amount of regenerative braking is reduced to alleviate the shift shock, and in this case, a slip phenomenon may occur during braking.

Republic of Korea Patent Publication No. 1856415 proposes a technique for improving a non-uniform shifting feeling generated in a process of a change in speed using braking torque of the auxiliary braking device. However, technology disclosed in the present patent document cannot be implemented in a vehicle not equipped with a retarder. In addition, in the technology disclosed in the present patent document, the amount of reduction in regenerative braking torque during a change in speed becomes excessive, so that regenerative braking is temporarily released, that is, it is impossible to control regenerative braking torque to be appropriately reduced.

The above descriptions regarding background technologies have been made only for enhancement of understanding of the background of the present disclosure, and are not to be deemed by those skilled in the art to correspond to already-know prior arts, and should not be taken as acknowledgment that this information forms any part of prior art.

SUMMARY

An aspect of the present disclosure is to provide an apparatus for controlling a change in speed of a vehicle and a method for controlling a change in speed of a vehicle capable of resolving shift shock, braking slip, and the like, without using a retarder during a change in speed by regenerative braking in a vehicle, such as a large electric vehicle equipped with a transmission.

According to an aspect of the present disclosure, an apparatus for controlling a change in speed of a vehicle may include: an auxiliary braking signal unit receiving an auxiliary braking related signal from a driver; a vehicle control unit receiving the auxiliary braking related signal from the auxiliary braking signal unit while controlling the vehicle; a motor control unit receiving a command for auxiliary braking from the vehicle control unit and decelerating the vehicle by regenerative braking of a driving motor; a transmission control unit for controlling a transmission during deceleration of the vehicle and transmitting information of whether a change in speed is performed to the vehicle control unit; and a braking control unit connected to a brake through a fluid pressure line, and controlling the brake so that the brake applies braking pressure to the wheel by an amount of reduction in regenerative braking torque when the transmission is downshifted.

The driving motor and the transmission may be disposed adjacent to an axle of the vehicle, and the transmission may be connected to the axle or incorporated in the axle.

The vehicle control unit may control the motor control unit to reduce the regenerative braking torque or to make the regenerative braking torque to zero when the transmission is downshifted.

The braking control unit may obtain driving torque of the driving motor output from the motor control unit and acceleration of the vehicle by differentiating a vehicle speed, and obtain a mass of the vehicle from the driving torque and the acceleration, and calculate a weight estimate value of the vehicle.

The apparatus for controlling a change in speed of the vehicle may further include a weight estimating unit for estimating a weight of the vehicle, and the weight estimating unit may transmit a weight estimate value of the vehicle to the vehicle control unit.

The weight estimating unit may calculate the weight estimate value of the vehicle from a pressure measurement value or air measured by a pressure sensor in an air suspension included in the vehicle.

When the transmission is downshifted, the vehicle control unit may determine the amount of reduction in regenerative braking torque and a magnitude of the braking pressure of the brake based on the weight estimate value of the vehicle, the motor control unit may control to reduce the regenerative braking torque of the driving motor by the determined amount of reduction in regenerative braking torque, and the braking control unit may control the determined magnitude of the braking pressure to be applied to the wheel by the brake.

According to another aspect of the present disclosure, a method for controlling a change in speed of a vehicle may include: an operation of receiving an auxiliary braking related signal by a driver; an operation of decelerating the vehicle by generating regenerative braking torque from a driving motor; an operation of determining whether a transmission is performing a change in speed during the operation of decelerating the vehicle; an operation of reducing the regenerative braking torque when the transmission is downshifted; and an operation of operating a brake so that braking pressure is applied to a wheel by an amount of reduction in regenerative braking torque.

The method for controlling a change in speed of the vehicle may further include an operation of determining whether a change in speed of the transmission has been completed; and an operation of releasing the braking pressure applied to the wheel by the brake when the change in speed of the transmission is completed.

The method for controlling a change in speed of the vehicle may further include an operation of estimating a weight of the vehicle; and an operation of determining the amount of reduction in the regenerative braking torque and a magnitude of the braking pressure of the brake based on a weight estimate value of the vehicle.

In the operation of determining the amount of reduction in regenerative braking torque and a magnitude of the braking pressure of the brake, the amount of reduction in regenerative braking torque is inversely proportional to the weight estimate value of the vehicle, and the magnitude of the braking pressure of the brake may increase by the amount of reduction in regenerative braking torque.

In the operation of estimating a weight of the vehicle, a weight estimate value of the vehicle may be calculated in proportion to a pressure measurement value measured by a pressure sensor in an air suspension of the vehicle.

In the operation of estimating of a weight of the vehicle, acceleration of the vehicle is obtained by differentiating a vehicle speed, a mass of the vehicle is obtained from the acceleration and driving torque of the driving motor, and a weight estimate value of the vehicle may be calculated.

BRIEF DESCRIPTION OF DRAWINGS

The above and other aspects, features, and advantages of the present disclosure will be more clearly understood from the following detailed description, taken in conjunction with the accompanying lead-outs, in which.

DETAILED DESCRIPTION

Figure 1:
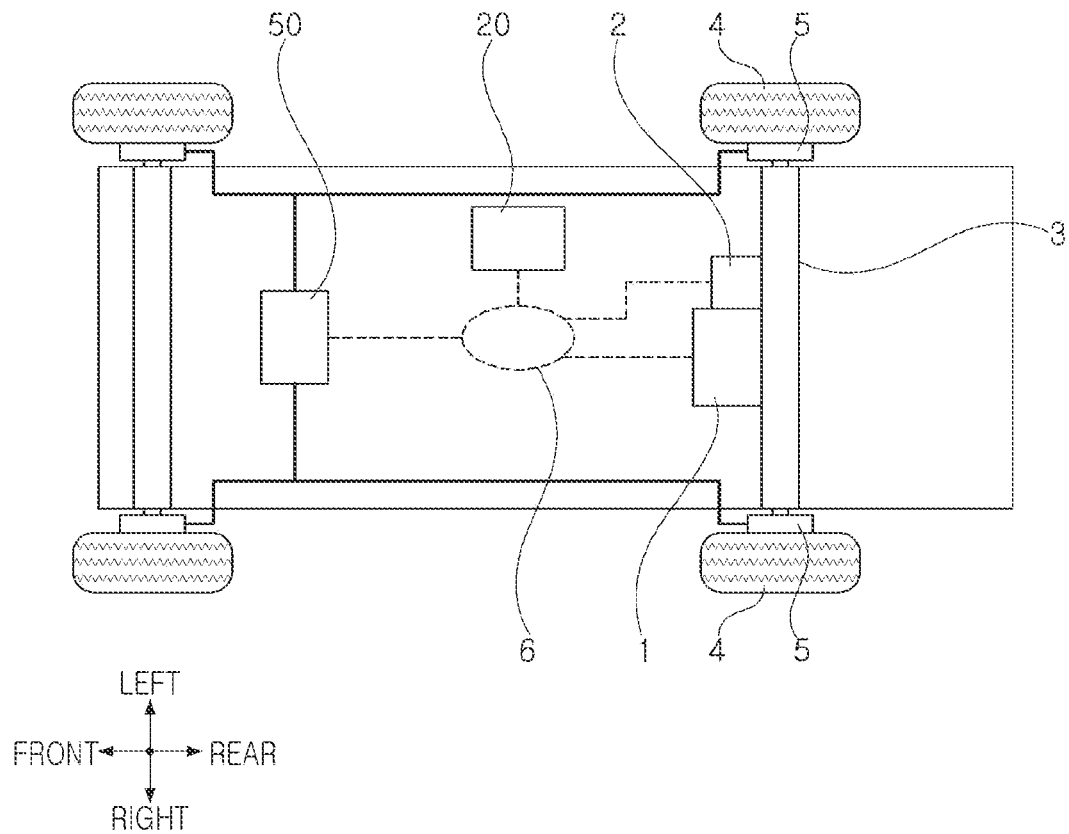
FIG. 1 is a view schematically illustrating a vehicle to which an apparatus for controlling a change in speed according to the present disclosure is applied.

Hereinafter, embodiments in the present disclosure will be described hereinafter with reference to the accompanying drawings. The disclosure may, however, be exemplified in many different forms and should not be construed as being limited to the specific embodiments set forth herein. Rather, these embodiments are provided so that this disclosure will be thorough and complete, and will fully convey the scope of the invention to those skilled in the art. In the drawings, the same reference numerals will be used throughout to designate the same or like elements, and the shapes and dimensions of elements may be exaggerated for clarity.

Large vehicles such as buses, trucks, or the like, use pneumatic brakes that are easy to handle and have fewer breakdowns as a main braking device, but when driving downhill, since a weight of a vehicle body is heavy, it may be difficult to drive downhill stably, while solving problems such as heat generation, and the like, caused by braking with only the main braking device.

Therefore, a separate auxiliary braking device enabling safe deceleration by continuously maintaining a braking force for a long time while supplementing the braking force of the main braking device to reduce its load is used, and the performance of the auxiliary braking device is regulated by laws and regulations.

In a large vehicle using an existing engine, a device such as an engine brake, an exhaust brake, a retarder, or the like, may be used as an auxiliary braking device.

On the other hand, as described above, since, for example, a large electric vehicle equipped with a fuel cell system is driven only by driving force of a driving motor without an engine, the driving motor cannot be used as an auxiliary braking device like an engine brake or an exhaust brake.

Furthermore, although a retarder may be used when a transmission is mounted, in this case, it is impossible to control to reduce regenerative braking torque properly, so that the amount of reduction in regenerative braking torque during a change in speed becomes excessive, and the regenerative braking is temporarily released.

Accordingly, in the present disclosure, it is intended to propose a method capable of satisfying laws related to auxiliary braking, as well as resolving shift shock, braking slip, and the like, during a change in speed without using a retarder, and optimally controlling regenerative braking.

Hereinafter, the present disclosure will be described in detail with reference to exemplary drawings. In adding reference numerals to components in each drawing, it should be noted that the same components are assigned the same reference numerals as much as possible, even though they are indicated in different drawings.

In the present specification, a vehicle refers to various vehicles that move a transported object such as a person, an animal, or an object from a departure point to a destination. Such vehicles are not limited to vehicles traveling on roads or tracks.

In the present specification, for convenience of description, the present disclosure is described by taking a large electric vehicle as an example, but the present disclosure is not necessarily limited thereto.

In addition, the terms "left", "right", "left and right", "front and back" used in relation to the direction are defined based on the vehicle or a body thereof, that is, an installation object.

FIG. 1 is a view schematically showing a vehicle to which an apparatus for controlling a change in speed according to the present disclosure is applied.

The vehicle may include a battery or a fuel cell (not shown) as a power source, a driving motor 1 for driving the vehicle, a transmission 2 for changing a rotational speed output from the driving motor, and an axle 3 for transmitting rotational power output from the transmission to both wheels 4.

An output of the driving motor 1 is controlled by a motor control unit 30 (see, for example, FIG. 2) and transmitted to the transmission 2. The transmission may perform shift control by a transmission control unit 40 (see, for example, FIG. 2), and may be, for example, a multi-speed transmission.

The motor control unit 30 and the transmission control unit 40 may be electrically connected to the vehicle control unit 20 through an in-vehicle local area network 6, or the like. A detailed description thereof will be given later.

The axle 3 may be disposed and connected to a side of the output of the transmission 2, so that the axle may receive rotational power that is changed in speed from the transmission. In an axle housing of the axle, the axle shaft is disposed to extend left and right, and is connected to a left wheel 4 and a right wheel 4, respectively.

For example, in the present disclosure, both the driving motor 1 and the transmission 2 are disposed close to the axle 3 of the vehicle, and the transmission may be directly connected to or incorporated in the axle. That is, the driving motor 1 and the transmission 2 may be configured as a motor-transmission-axle integrated module in which the driving motor 1 and the transmission 2 are directly connected to the axle 3.

When the driving motor and the transmission 2 are integrally modularized with the axle 3 and configured as described above, an advantage such as, the number of components may be reduced, a problem of connection parts and boundary components is minimized, a space occupied in the vehicle is reduced, a material cost is reduced, and the like may be obtained.

Driving force transmitted from the driving motor 1 to the transmission 2 rotates both wheels 4 through an axle shaft in the axle 3 and is transmitted to the road surface.

In addition, as shown in FIG. 1, the vehicle may include a brake 5 mounted on each wheel 4 to perform braking, and a braking control unit 50 connected to a brake through a fluid pressure line and controlling braking pressure applied to each wheel.

The brake 5 is installed for each wheel 4, and may be connected to a fluid pressure line providing hydraulic or pneumatic pressure, or the like. For example, when the vehicle is a large electric vehicle, a pneumatic brake may be employed as the brake.

In the pneumatic brake, a relatively large braking force can be generated compared to hydraulic pressure using air pressurized by a separately mounted air compressor and stored in an air tank. When a driver presses a brake pedal and a signal is transmitted, an air pressure control valve may be opened, the pressurized air in the air tank may be delivered to the corresponding brake chamber of each wheel, and pressure may be applied to a brake pad to compress a disk or drum, thereby generating braking pressure.

However, an example embodiment of the present inventive concept is not necessarily limited thereto, and, for example, a hydraulic brake may be employed.

In the hydraulic brakes, hydraulic pressure may be supplied to hydraulic lines and brakes through a pump operated by a separate motor. A valve block, downstream of the pump, is provided with a plurality of solenoid valves for each hydraulic line, to distribute appropriate braking pressure to each wheel.

Figure 2:
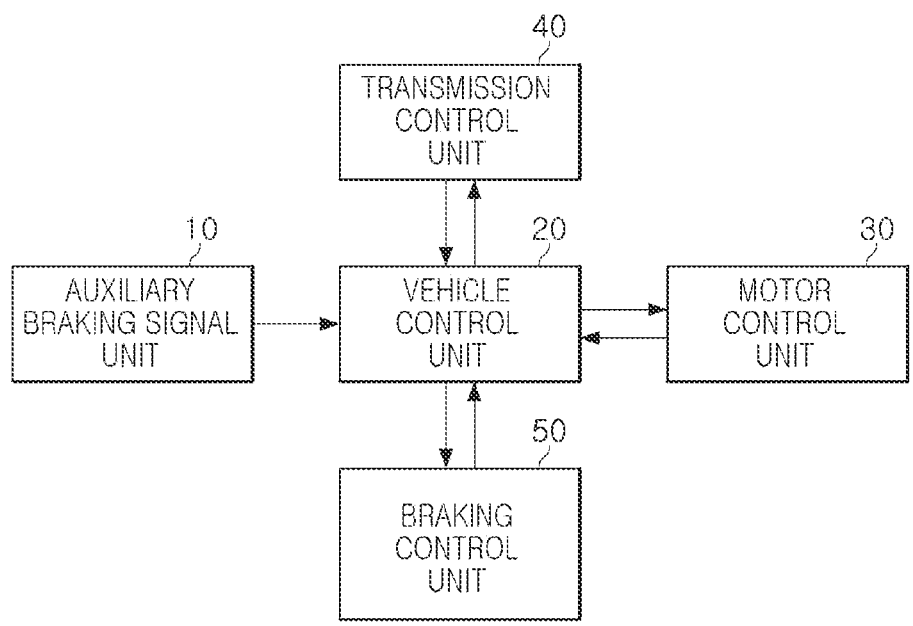
FIG. 2 is a configuration diagram schematically illustrating an apparatus for controlling a change in speed of a vehicle according to a first embodiment of the present disclosure is applied.

FIG. 2 is a configuration diagram schematically illustrating an apparatus for controlling a change in speed of a vehicle according to a first embodiment of the present disclosure.

The apparatus for controlling a change in speed of a vehicle according to a first embodiment of the present disclosure may include a processor (e.g., computer, microprocessor, CPU, ASIC, circuitry, logic circuits, etc.) and an associated non-transitory memory storing software instructions which, when executed by the processor, provides the functionalities of an auxiliary braking signal unit 10, a vehicle control unit 20, a motor control unit 30, a transmission control unit 40, and a braking control unit 50. Here, the vehicle control unit 20 may process signals transmitted between elements of the apparatus, and in particular may process signals communicated between the vehicle control unit 20 and the auxiliary braking signal unit 10, motor control unit 30, transmission control unit 40, and braking control unit 50. The processor may take the form of one or more processor(s) and associated memory storing program instructions. Herein, the memory and the processor may be implemented as separate semiconductor circuits. Alternatively, the memory and the processor may be implemented as a single integrated semiconductor circuit.

The auxiliary braking signal unit 10 may include an operation switch for auxiliary braking. The operation switch may be operated by the driver, and the auxiliary braking signal unit may receive a corresponding auxiliary braking related signal.

For example, when the operation switch is switched to, for example, on or any one of the 1st to 3rd braking levels for the operation of the auxiliary braking according to the driver's will to operate, the auxiliary braking signal unit detects the switching of the operation switch and transmits the corresponding signal to a vehicle control unit 20.

The vehicle control unit (VCU) 20 may receive an auxiliary braking related signal from the auxiliary braking signal unit 10 while controlling the vehicle to control regenerative braking and a change in speed.

For example, when control to increase or decrease the driving force of the driving motor 1 is required, the vehicle control unit 20 may send a command to calculate an appropriate driving force and to apply the calculated driving force to the motor control unit 30 through an in-vehicle local area network 6, or the like, and send a command to the transmission control unit 40 to switch the transmission 2 to an appropriate speed step.

Here, a controller area network (CAN) communication network may be used as the local area network 6, but is not limited thereto, and any other communication network may be used and at least partially wired communication may be used.

The motor control unit (MCU) 30 may receive a command for auxiliary braking from the vehicle control unit 20 and convert the driving motor 1 into a generator to decelerate the wheels 4 and the vehicle by regenerative braking. Output of the driving motor may be transmitted to the transmission 2 under the control of the motor control unit.

The transmission control unit 40 may control the transmission 2. For example, the transmission uses rotational power of the driving motor 1 to convert to target torque. That is, the transmission may convert the received rotational power into the target torque by selecting a speed step according to a vehicle speed, and the like, and may make the vehicle to travel using the converted target torque as a driving force to output the same to the wheels 4 through an axle shaft.

In addition, the transmission control unit 40 may control the transmission 2 during deceleration of the vehicle, detect a progress of a change in speed, in particular, the shifted speed steps, and transmit the same to the vehicle control unit 20.

The braking control unit 50 may be connected to the brake 5 via a fluid pressure line to control the braking pressure applied to each wheel 4.

When a pneumatic brake is employed, the braking control unit 50 may determine braking pressure in consideration of air pressure, vehicle speed, regenerative braking torque, and the like, and adjust pressure of air through an air pressure control valve of a pneumatic line driving the brake 5.

However, an operation of the braking control unit 50 is not necessarily limited thereto. For example, when the brake 5 is a hydraulic brake, the braking control unit 50 may calculate braking pressure in consideration of hydraulic pressure, vehicle speed, regenerative braking torque, and the like, and may control hydraulic pressure through a solenoid valve of the hydraulic line, or the like, while operating a pump for driving the brake 5.

Accordingly, the braking control unit 50 may control the braking torque of the wheel by applying braking pressure to the wheel 4 by the brake 5.

For example, when a switching signal of the operation switch is transmitted from the auxiliary braking signal unit 10, the vehicle control unit 20 may control the motor control unit 30 to initiate regenerative braking of the driving motor 1. In this case, when the operation switch is switched to any one of the 1st to 3rd braking levels, regenerative braking torque may be determined according to the corresponding braking levels.

In addition, when a signal for downshifting of the transmission 2 is input from the transmission control unit 40, the vehicle control unit 20 may instruct the motor control unit 30 to reduce regenerative braking torque or make regenerative braking torque to zero during deceleration of the vehicle, and may instruct the braking control unit 50 to form braking pressure.

Here, an amount of reduction in regenerative braking torque may be determined by reflecting a tuning value of the transmission. For example, the tuning value may be obtained from a control map including a braking amount for each speed step, and this control map may be preset or reset through learning.

In addition, the amount of reduction in regenerative braking torque and the braking pressure or the braking torque have a function relationship that is inversely proportional to each other.

When the transmission 2 is downshifted, the brake control unit 50 may control the brake so that the brake 5 generates a corresponding amount of braking pressure and applies the same to the wheels 4 by the amount of reduction in regenerative braking torque. In other words, when the transmission is downshifted, the braking control unit may control the brake to exert main braking without operation of the brake pedal.

In the apparatus for controlling a change in speed of a vehicle according to a first embodiment of the present disclosure, through this configuration, constant deceleration of the vehicle may be maintained using a brake for main braking without a retarder during a change in speed by regenerative braking is performed in a vehicle such as a large electric vehicle equipped with a transmission.

Figure 3:
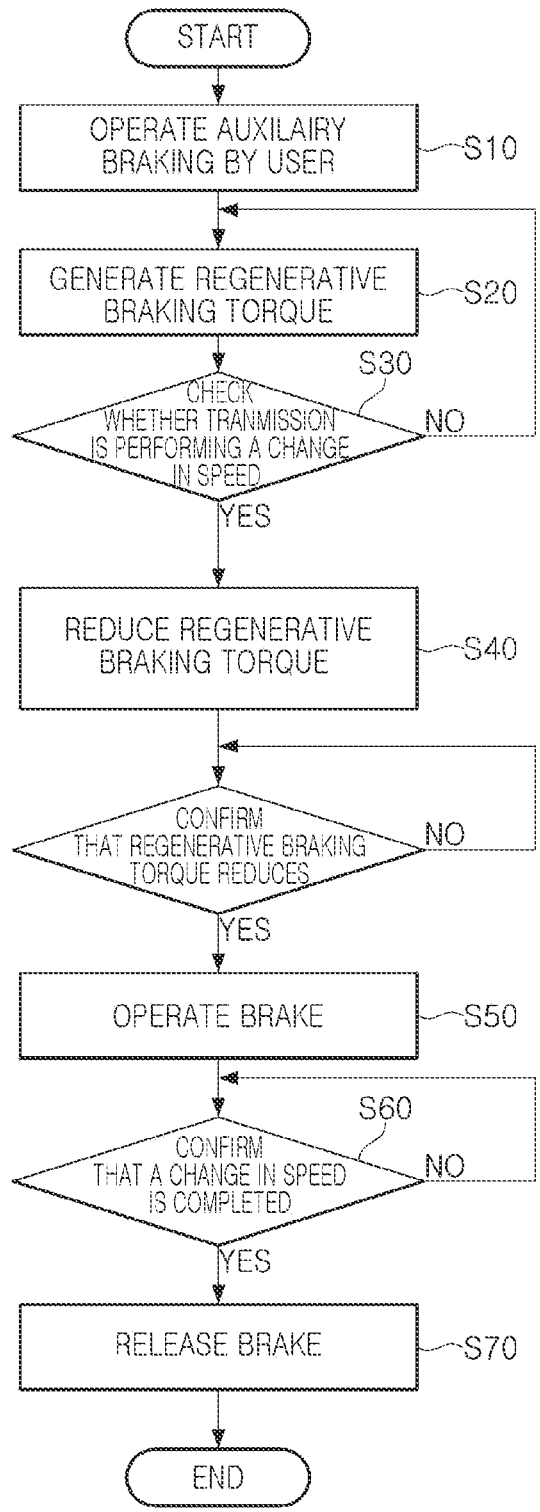
FIG. 3 is a flowchart illustrating a method for controlling a change in speed by the apparatus for controlling a change in speed of a vehicle according to a first embodiment of the present disclosure.

FIG. 3 is a flowchart illustrating a method for controlling a change in speed by the apparatus for controlling a change in speed of a vehicle according to a first embodiment of the present disclosure.

The method for controlling a change in speed by the apparatus for controlling a change in speed of the vehicle according to a first embodiment of the present disclosure may be initiated from a driver's will to operate auxiliary braking. For example, when the vehicle is travelling downhill, the driver operates an operation switch of the auxiliary braking signal unit 10 to operate the auxiliary brake (S10).

The vehicle control unit 20 may control the driving motor 1 to generate regenerative braking torque by the motor control unit 30 as an auxiliary braking related signal by the driver is received from the auxiliary braking signal unit 10. As a result, deceleration of the wheel 4 and the vehicle may be achieved (S20).

During deceleration of the vehicle, the transmission control unit 40 may control a change in speed of the transmission 2 using the output torque of the driving motor 1, that is, regenerative braking torque.

The vehicle control unit 20 may confirm a change in speed of the transmission 2 through the transmission control unit 40, and in particular, whether the transmission is downshifted (S30).

For example, when the change in speed of the transmission such as downshift is confirmed, the vehicle control unit 20 may instruct the motor control unit 30 to reduce regenerative braking torque or make regenerative braking torque to zero (S40).

Subsequently, when the reduction in regenerative braking torque is confirmed, the vehicle control unit 20 instructs the braking control unit 50 to form braking pressure by an amount of reduction in regenerative braking torque. The braking control unit may apply braking pressure to the wheel 4 by adjusting air pressure or hydraulic pressure provided to the brake 5 to operate the brake (S50).

The vehicle control unit 20 may confirm whether the change in speed of the transmission 2 is completed through the transmission control unit 40 (S60).

Finally, when the change in speed of the transmission 2 is completed, the vehicle control unit 20 may release the pressure applied to the wheel 4 by the brake 5 through the braking control unit 50 and terminate the control (S70).

As described above, according to the method for controlling a change in speed by the apparatus for controlling a change in speed of the vehicle according to a first embodiment of the present disclosure, constant deceleration of the vehicle may be maintained using a brake for main braking without using a retarder during the change in speed by regenerative braking in a vehicle such as a large electrical vehicle equipped with a transmission.

Figure 4:
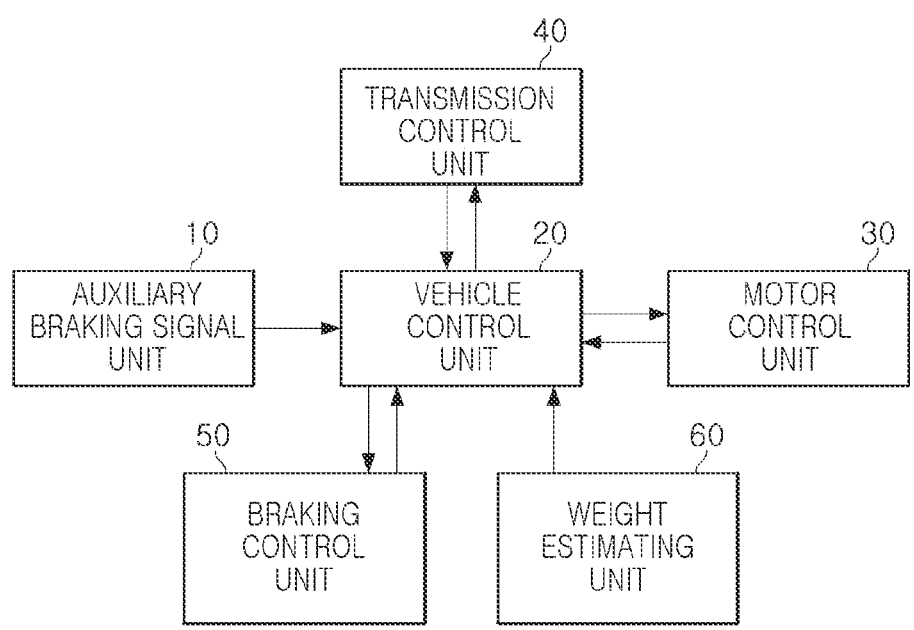
FIG. 4 is a configuration diagram schematically illustrating an apparatus for controlling a change in speed of a vehicle according to a second embodiment of the present disclosure.

FIG. 4 is a configuration diagram schematically illustrating an apparatus for controlling a change in speed of a vehicle according to a second embodiment of the present disclosure.

As shown, the apparatus for controlling a change in speed of a vehicle according to a second embodiment of the present disclosure may include a processor and an associated non-transitory memory storing software instructions which, when executed by the processor, provides the functionalities of an auxiliary braking signal unit 10, a vehicle control unit 20, a motor control unit 30, a transmission control unit 40, and a braking control unit 50, and a weight estimating unit 60. Here, the vehicle control unit 20 may process signals transmitted between elements of the apparatus, and in particular may process signals communicated between the vehicle control unit 20 and the auxiliary braking signal unit 10, motor control unit 30, transmission control unit 40, braking control unit 50, and weight estimating unit 60. The processor may take the form of one or more processor(s) and associated memory storing program instructions. Herein, the memory and the processor may be implemented as separate semiconductor circuits. Alternatively, the memory and the processor may be implemented as a single integrated semiconductor circuit.

In the second embodiment of the present disclosure shown in FIG. 4, the only difference is that the weight estimating unit 60 is added, and the remaining components are the same as those of the first embodiment shown in FIG. 2. Accordingly, in describing the apparatus for controlling a change in speed of a vehicle according to a second embodiment of the present disclosure, the same reference numerals are given to the same components as those of the apparatus for controlling a change in speed of a vehicle according to the first embodiment described above, and a detailed description of the configuration and function thereof will be omitted.

The weight estimating unit 60 may estimate a weight of the vehicle by adding a weight of the vehicle itself to a weight of the number of passengers and/or loaded cargo in the vehicle. For example, the weight estimating unit may calculate a weight estimate value of the vehicle in proportion to a pressure measurement value measured by a pressure sensor provided in an air suspension (not shown).

A suspension of the vehicle may support a weight of a vehicle body and at the same time mitigate and absorb shocks caused by vertical vibration of wheels due to road surface irregularities, or the like, thereby preventing the vibration from being directly transmitted to the vehicle body. As a result, the suspension can improve riding comfort while improving driving stability, protection of loads, reduction of dynamic stresses in each part of the vehicle body, turning characteristics, and the like.

For example, an air suspension may be provided in a large electric vehicle such as a bus, a truck, or the like. Since the air suspension uses an air spring using elasticity of compressed air, it is possible to obtain flexible elasticity while absorbing even minute vibrations, thereby providing excellent ride comfort. In addition, the air suspension can be kept constant up to a car height regardless of the weight by adjusting the air pressure.

Since the configuration and operation of such an air suspension is a known technology, a detailed description thereof will be omitted herein.

However, a pressure sensor (not shown) may be provided in the air suspension, and the pressure sensor may measure an air pressure changed due to air introduced into the air suspension and transmit a signal to the weight estimating unit 60. When the weight of the vehicle is heavy, the pressure sensor in the air suspension is greatly pressed by air, and the weight of the vehicle may be monitored by the measured pressure value.

As described above, the weight estimating unit 60 may calculate a weight estimating value of the vehicle in proportion to a pressure measurement value measured by a pressure sensor. In this case, it is preferable that a characteristic coefficient of the air suspension determined by a temperature, shape, pressure, and other external factors is reflected.

The vehicle control unit 20 may receive the weight estimate value of the vehicle from the weight estimating unit 60. Such a weight estimating unit may be incorporated into the vehicle control unit or may be used in combination with the vehicle control unit.

However, the weight estimation of the vehicle is not necessarily limited to the above-described example, and may be implemented by any other method.

For example, the braking control unit 50 may receive output driving torque of the driving motor 1 from the motor control unit 30 when the vehicle drives. In addition, the braking control unit constantly monitors a vehicle speed for main braking, and by differentiating the vehicle speed, acceleration of the vehicle can be obtained. Accordingly, the braking control unit may obtain amass of the vehicle according to Newton's second law of motion and estimate the weight therefrom.

As described above, the vehicle control unit 20 may receive a weight estimate value of the vehicle from the braking control unit 50.

When a signal for downshifting is input from the transmission control unit 40, the vehicle control unit 20 may determine an amount of reduction in regenerative braking torque and a magnitude of braking pressure of the brake 5 based on the input weight estimate value of the vehicle. For example, when the weight is relatively light, since the shift shock in the transmission 2 is large, regenerative braking torque may be greatly reduced and the braking pressure of the brake may be increased by an amount equal to the reduction in regenerative braking torque.

For example, the amount of reduction in regenerative braking torque according to the weight may be obtained from a control map, and the control map may be preset in the vehicle control unit 20 or reset through learning.

Subsequently, during deceleration of the vehicle, the motor control unit 30 may control to reduce regenerative braking torque of the driving motor 1 by the determined amount of reduction in the regenerative braking torque, and the braking control unit 50 may control the determined braking pressure to be applied to wheels by the brake 5.

As described above, when the transmission is downshifted, the braking control unit 50 may control the brake to generate braking pressure of a corresponding magnitude by the amount of reduction in regenerative braking torque. In other words, when the transmission is downshifted, the braking control unit can control the brake to exert main braking without an operation of a brake pedal.

The apparatus for controlling a change in speed of a vehicle according to a second embodiment of the present disclosure may determine an amount of reduction in regenerative braking and an amount of increase in main braking according to the weight of the vehicle through this configuration, and thus optimally control regenerative braking during a change in speed.

Figure 5:
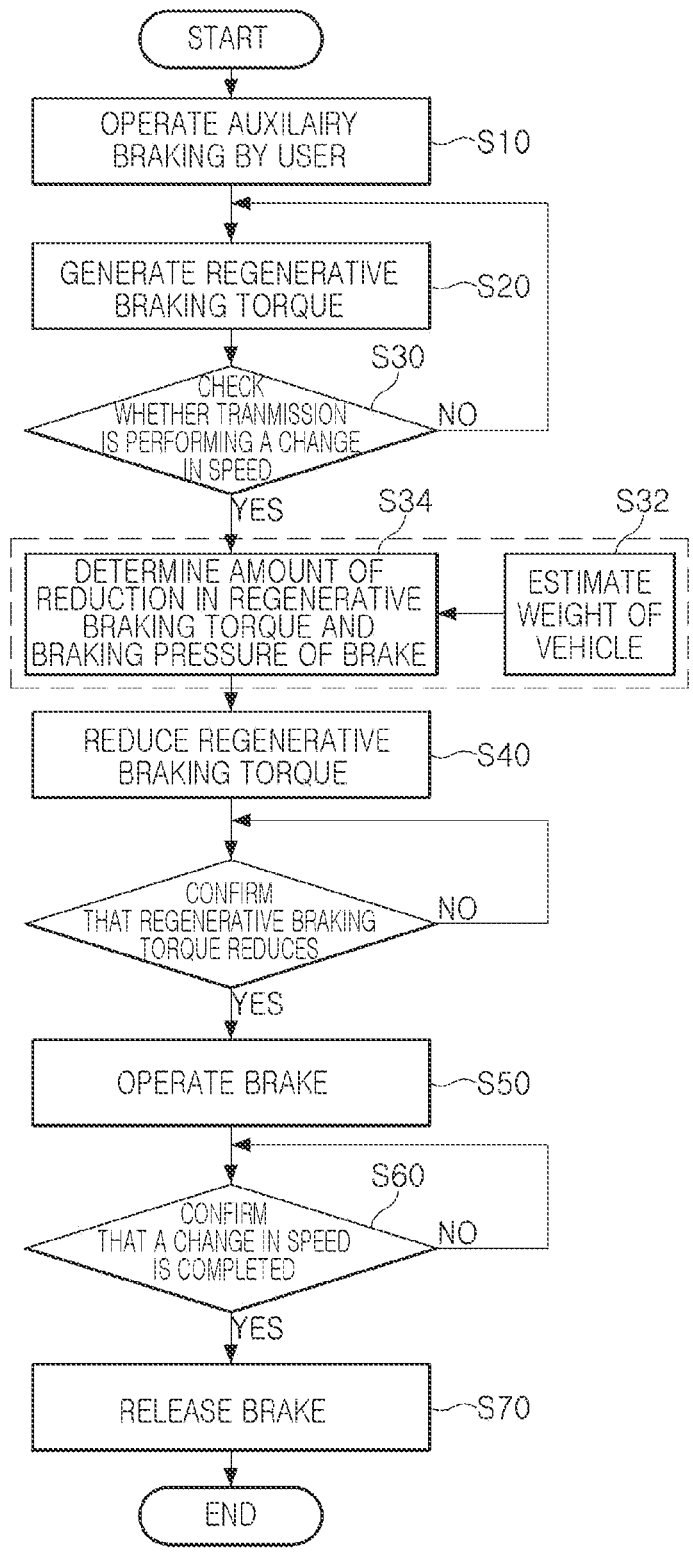
FIG. 5 is a flowchart illustrating a method for controlling a change in speed by the apparatus for controlling a change in speed of a vehicle according to a second embodiment of the present disclosure.

FIG. 5 is a flowchart illustrating a method for controlling a change in speed by an apparatus for controlling a change in speed of a vehicle according to a second embodiment of the present disclosure.

A method for controlling a change in speed of a vehicle according to a second embodiment of the present disclosure may include an operation of estimating a weight of a vehicle (S32); and an operation of determining an amount of reduction in regenerative braking torque and a magnitude of braking pressure of a brake based on the weight estimate value of the vehicle (S34), which are different from the method for controlling a change in speed according to a first embodiment shown in FIG. 3, the remaining components thereof are the same as the method for controlling a change in speed according to a first embodiment shown in FIG. 3.

The method for controlling a change in speed by an apparatus for controlling a change in speed of a vehicle according to a second embodiment of the present disclosure may be initiated from a driver's will to operate auxiliary braking. For example, when the vehicle is travelling downhill, the driver operates an operation switch of the auxiliary braking signal unit 10 to operate auxiliary braking (S10).

The vehicle control unit 20 may control the driving motor 1 to generate regenerative braking torque by the motor control unit 30 as an auxiliary braking related signal is input from the auxiliary braking signal unit 10 by a driver. Thereby, deceleration of the wheel 4 and the vehicle can be performed (S10).

During deceleration of the vehicle, the transmission control unit 40 may control a change in speed of the transmission 2 using output torque of the driving motor 1, that is, regenerative braking torque.

The vehicle control unit 20 may determine the change in speed of the transmission 2 through the transmission control unit 40, in particular, whether the transmission is downshifted (S30).

For example, when the a change in speed of the transmission such as downshift is confirmed, the vehicle control unit 20 may receive a weight estimate value of the vehicle from the weight estimating unit 60 or the braking control unit 50, and may determine an amount of reduction of regenerative braking torque and a magnitude of braking pressure of the brake based on the weight estimate value thereof (S34). When the weight of the vehicle is relatively light, since the shift shock in the transmission is greatly generated, regenerative braking torque can be greatly reduced, and the braking pressure of the brake can be increased by the amount of reduction in regenerative braking torque.

Here, the weight estimating unit 60 may calculate a weight estimate value of the vehicle in proportion to a pressure measurement value measured by the pressure sensor in the air suspension and monitor the same (S32).

Alternately, the braking control unit 50 may obtain acceleration of the vehicle by differentiating the monitored vehicle speed and the output driving torque of the driving motor 1 from the motor control unit 30, and then obtain a mass of the vehicle from the torque and the acceleration, and may calculate a weight estimate value therefrom (S32).

The vehicle control unit 20 may control the motor control unit 30 to reduce regenerative braking torque by the determined reduction amount of regenerative braking torque (S40).

Subsequently, when the reduction in regenerative braking torque is confirmed, the vehicle control unit 20 instructs the braking control unit 50 to form braking pressure by an amount equal to the decrease in regenerative braking torque. The braking control unit may apply braking pressure to the wheel 4 by adjusting an air pressure or hydraulic pressure provided to the brake 5 to operate the brake (S50).

The vehicle control unit 20 may check whether a change in speed of the transmission 2 is completed through the transmission control unit 40 (S50).

Finally, when the change in speed of the transmission 2 is completed, the vehicle control unit 20 may release the pressure applied to the wheel 4 by the brake 5 through the braking control unit 50 and terminate the control (S70).

As described above, according to the method for controlling a change in speed by the apparatus for controlling a change in speed of a vehicle according to a second embodiment, the amount of deceleration of regenerative braking torque and the increase amount of the main braking can be determined according to the weight of the vehicle, and accordingly, the regenerative braking during a change in speed may be optimally controlled.

Figure 6:
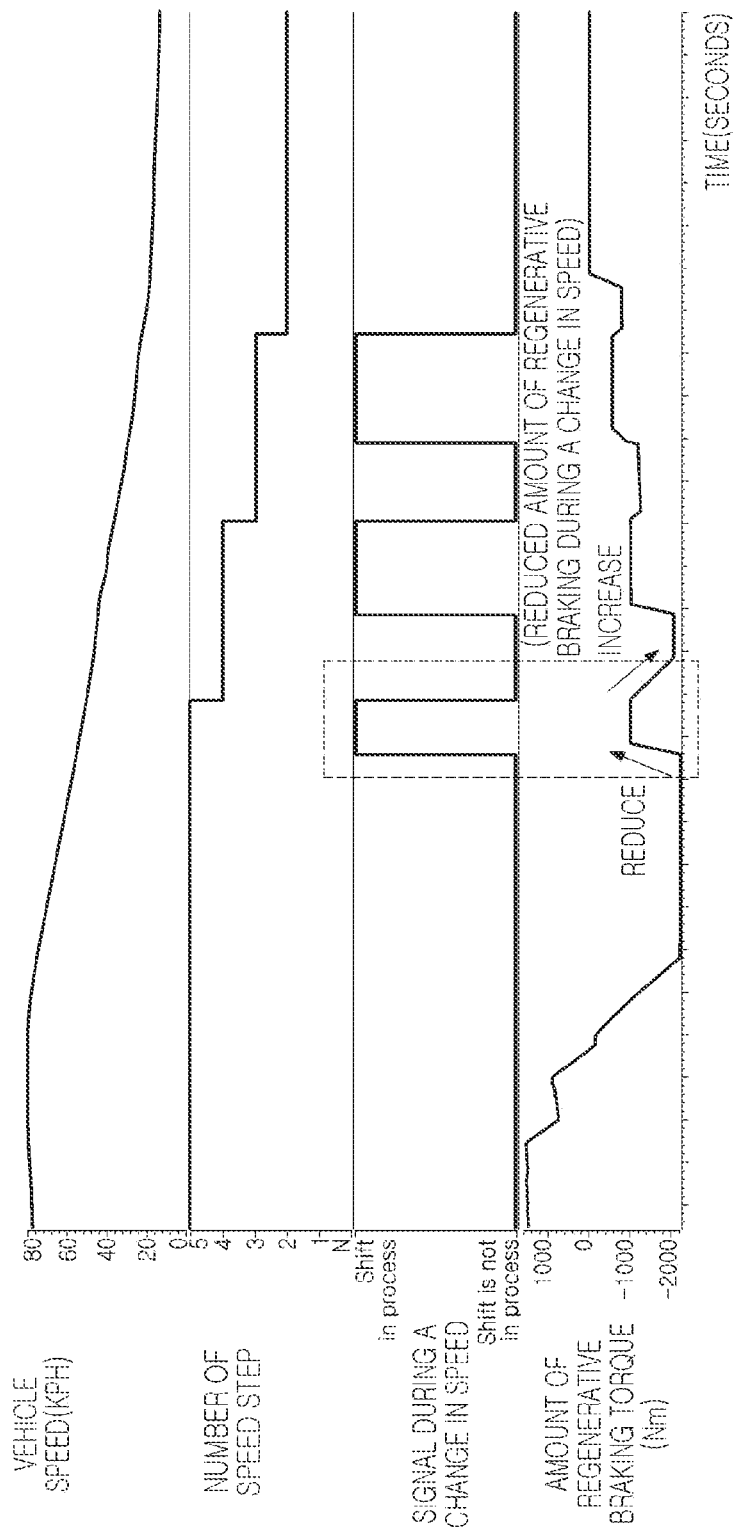
FIG. 6 is a graph illustrating an actual shift state in a vehicle to which the present disclosure is applied.

FIG. 6 is a graph illustrating an actual shift state in a vehicle to which the present disclosure is applied.

As shown in this figure, for example, when a vehicle is being decelerated by regenerative braking in a vehicle such as a large electric vehicle equipped with a transmission 2, it can be confirmed that the transmission performs a change in speed by being downshifted.

Moreover, it can be seen that a regenerative braking torque of a driving motor 1 decreases and then increases again during deceleration of the vehicle whenever the transmission is downshifted.

In the present disclosure, when the transmission 2 is downshifted, a brake 5 generates braking pressure by the an amount equal to the reduced amount of regenerative braking torque and control the same to be applied to wheels 4, so that there is an advantage in that the shift shock may be prevented.

Figure 7A:
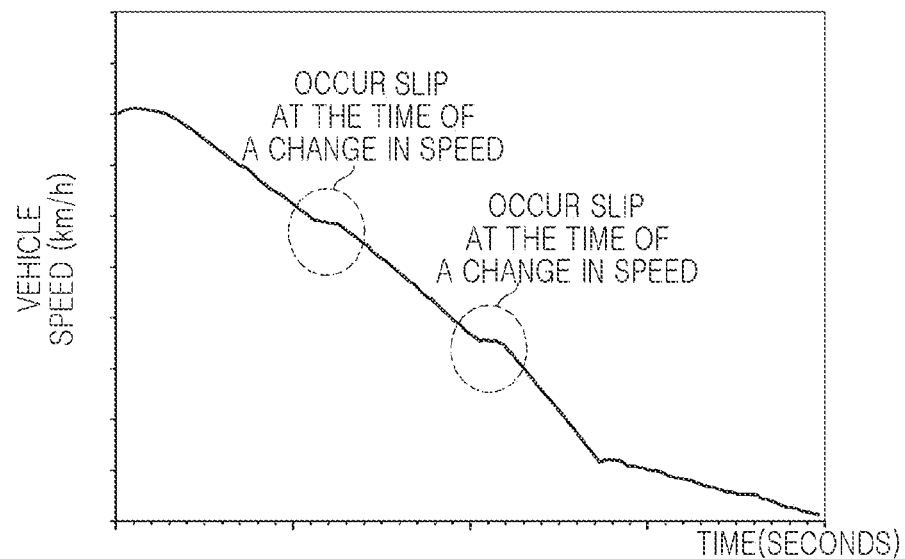
FIGS. 7A and 7B are graphs illustrating a change in speed according to time during a change in speed according to the related art and the present disclosure.
Figure 7B:
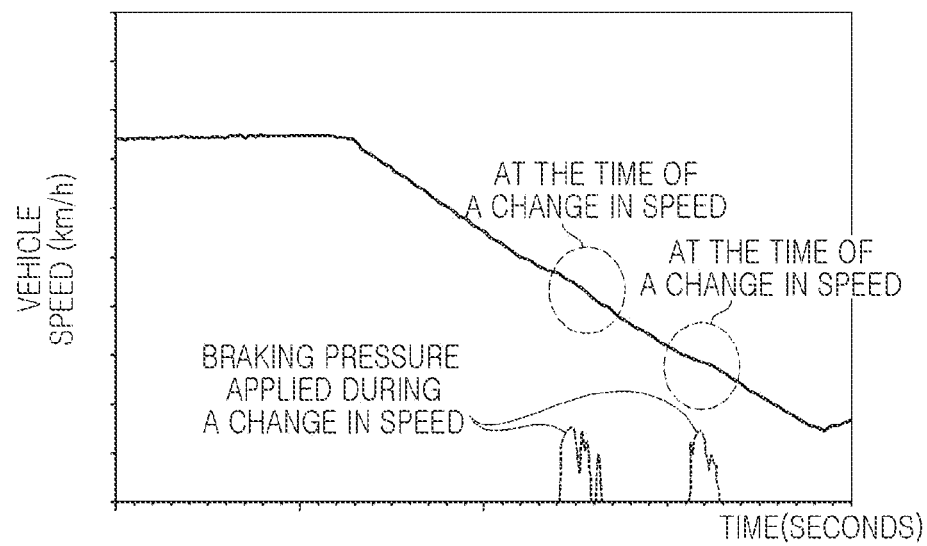

FIGS. 7A and 7B are graphs illustrating a change in speed according to time during a change in speed in the related art (FIG. 7A) and the present disclosure (FIG. 7B).

In FIG. 7A, a regenerative braking torque is temporarily reduced using a retarder to minimize shift shock, but there is a disadvantage in that deceleration of the vehicle cannot be constantly maintained at the time of a change in speed, and a phenomenon of braking slip may occur.

In FIG. 7B, even when regenerative braking torque is temporarily reduced to minimize shift shock, main braking is exerted at the time of a change in speed, that is, the brake 5 may be operated, thereby maintaining a constant deceleration of the vehicle, and preventing a phenomenon of braking slip.

The pressure applied to the brake 5 for main braking is additionally indicated in a lower portion in (b) of FIG. 7. Specifically, braking pressure of about 0.2 bar is applied to the wheel 4 by a brake instantaneously during a change in speed to control a braking torque of the wheel.

As described above, according to an embodiment of the present disclosure, it is possible to eliminate shift shock, braking slip, and the like, without using a retarder during a change in speed by regenerative braking in a vehicle, such as a large electric vehicle equipped with a transmission.

As set forth above, according to the present disclosure, it is possible to prevent a phenomenon of shift shock and braking slip without a retarder when auxiliary braking is operated in a vehicle such as a large electric vehicle equipped with a transmission.

According to the present disclosure, there is an effect that regenerative braking during a change in speed may be optimally controlled, by determining an amount of reduction in regenerative braking and an increase amount of main braking according to a weight of the vehicle.

While the example embodiments have been illustrated and described above, it will be apparent to those skilled in the art that modifications and variations could be made without departing from the scope of the present invention as defined by the appended claims.

What is claimed is:

1. An apparatus for controlling a change in speed of a vehicle, comprising:
an operation switch for auxiliary braking configured to receive an auxiliary braking related signal from a driver;

a vehicle control unit electrically connected to the operation switch, and configured to receive the auxiliary braking related signal from the operation switch while controlling the vehicle;

a motor control unit electrically connected to the vehicle control unit and a driving motor, and configured to receive a command for auxiliary braking from the vehicle control unit and to decelerate the vehicle by regenerative braking of the driving motor;

a transmission control unit electrically connected to the vehicle control unit and a transmission, and configured to control the transmission during deceleration of the vehicle and to transmit information of whether a change in speed is performed to the vehicle control unit; and a braking control unit connected to a brake through a fluid pressure line, electrically connected to the vehicle control unit, and configured to control the brake so that the brake applies braking pressure to a wheel by an amount of reduction in regenerative braking torque when the transmission is downshifted, wherein the braking control unit is further configured to obtain driving torque of the driving motor output from the motor control unit and acceleration of the vehicle by differentiating a vehicle speed, and to obtain a mass of the vehicle from the driving torque and the acceleration, and to calculate a weight estimate value of the vehicle, and wherein the vehicle control unit determines the amount of reduction in regenerative braking torque and a magnitude of the braking pressure of the brake based on the weight estimate value of the vehicle when the transmission is downshifted.

2. The apparatus for controlling a change in speed of a vehicle of claim 1, wherein the driving motor and the transmission are disposed close to an axle of the vehicle, and the transmission is connected to the axle or incorporated in the axle.

3. The apparatus for controlling a change in speed of a vehicle of claim 1, wherein the vehicle control unit is further configured to control the motor control unit to reduce the regenerative braking torque or to make the regenerative braking torque to zero when the transmission is downshifted.

4. The apparatus for controlling a change in speed of a vehicle of claim 1,
wherein the motor control unit controls to reduce regenerative braking torque of the driving motor by the determined amount of reduction in regenerative braking torque, and
wherein the braking control unit controls the determined magnitude of the braking pressure to be applied to the wheel by the brake.

5. A method for controlling a change in speed of a vehicle, comprising:
an operation of receiving an auxiliary braking related signal by a driver;
an operation of decelerating the vehicle by generating regenerative braking torque from a driving motor;
an operation of determining whether a transmission is performing a change in speed during the operation of decelerating the vehicle;
an operation of estimating a weight estimate value of the vehicle;
an operation of determining an amount of reduction in regenerative braking torque and a magnitude of the braking pressure of a brake based on the weight estimate value of the vehicle;
an operation of reducing the regenerative braking torque when the transmission is downshifted; and
an operation of operating the brake so that the braking pressure is applied to a wheel by the amount of reduction in regenerative braking torque,
wherein in the operation of determining the amount of reduction in regenerative braking torque and the magnitude of the braking pressure of the brake, the amount of reduction in regenerative braking torque is inversely proportional to the weight estimate value of the vehicle, and the magnitude of the braking pressure of the brake increases by the amount of reduction in regenerative braking torque.

6. The method for controlling a change in speed of a vehicle of claim 5, further comprising:
an operation of determining whether the change in speed of the transmission has been completed; and
an operation of releasing the braking pressure applied to the wheel by the brake when the change in speed of the transmission is completed.

7. The method for controlling a change in speed of a vehicle of claim 5, wherein in the operation of estimating the weight estimate value of the vehicle, the weight estimate value of the vehicle is calculated in proportion to a pressure measurement value measured by a pressure sensor in an air suspension of the vehicle.

8. The method for controlling a change in speed of a vehicle of claim 5, wherein in the operation of estimating the weight estimate value of the vehicle, acceleration of the vehicle is obtained by differentiating a vehicle speed, a mass of the vehicle is obtained from the acceleration and driving torque of the driving motor, and the weight estimate value of the vehicle is calculated.

9. A method for controlling a change in speed of a vehicle, comprising:
an operation of receiving an auxiliary braking related signal by a driver;
an operation of decelerating the vehicle by generating regenerative braking torque from a driving motor;
an operation of determining whether a transmission is performing a change in speed during the operation of decelerating the vehicle;
an operation of estimating a weight estimate value of the vehicle;
an operation of determining an amount of reduction in regenerative braking torque and a magnitude of braking pressure of a brake based on the weight estimate value of the vehicle;
an operation of reducing the regenerative braking torque when the transmission is downshifted; and
an operation of operating the brake so that the braking pressure is applied to a wheel by the amount of reduction in regenerative braking torque,
wherein in the operation of estimating the weight estimate value of the vehicle, acceleration of the vehicle is obtained by differentiating a vehicle speed, a mass of the vehicle is obtained from the acceleration and driving torque of the driving motor, and the weight estimate value of the vehicle is calculated.

* * * * *